(12) United States Patent
Eike et al.

(10) Patent No.: US 6,205,875 B1
(45) Date of Patent: Mar. 27, 2001

(54) FLOW RESTRICTOR ASSEMBLY IN TRANSMISSION CLUTCH CONTROL SYSTEM

(75) Inventors: Craig Eike, DeKalb; Guy Thomas Stoever, Naperville, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/386,620

(22) Filed: Aug. 31, 1999

(51) Int. Cl.$^7$ .................................................. F16H 61/04
(52) U.S. Cl. ...................... 74/335; 192/109 F; 137/503
(58) Field of Search ...................... 74/335; 477/156, 477/158; 192/109 F; 137/503, 500

(56) References Cited

U.S. PATENT DOCUMENTS

| | | | |
|---|---|---|---|
| 3,964,372 | * | 6/1976 | Chatterjea ................... 192/109 F X |
| 3,964,506 | * | 6/1976 | Grundman ................... 192/109 F X |
| 4,425,620 | | 1/1984 | Batcheller et al. ................... 701/52 |
| 4,676,348 | * | 6/1987 | Coutant ......................... 74/335 X |
| 4,967,385 | | 10/1990 | Brekkestran et al. ........... 477/155 X |
| 5,902,344 | | 5/1999 | Eike et al. ......................... 701/67 |
| 5,908,098 | * | 6/1999 | Gorman et al. ................... 192/109 F |

\* cited by examiner

Primary Examiner—Charles A Marmor
Assistant Examiner—Ankur Parekh
(74) Attorney, Agent, or Firm—Foley & Lardner

(57) ABSTRACT

There is provided in accord with the present invention a work vehicle having a transmission and a clutch control system controlling the vehicle clutches, with the clutch control system including a flow restrictor assembly. The flow restrictor assembly comprises a modulator valve and an unloading valve in fluid communication with the fluid supply and the clutch control system. The unloading valve is selectively in fluid communication with the modulator valve through a modulator tank orifice and is responsive to fluid pressure changes acting on the modulator valve, as the clutch control system operates to control the length of time the modulator valve regulates the rate of flow of fluid to the clutch control system through the modulator tank orifice. In one embodiment the unloading valve spool is nested inside the modulator valve spool.

20 Claims, 10 Drawing Sheets

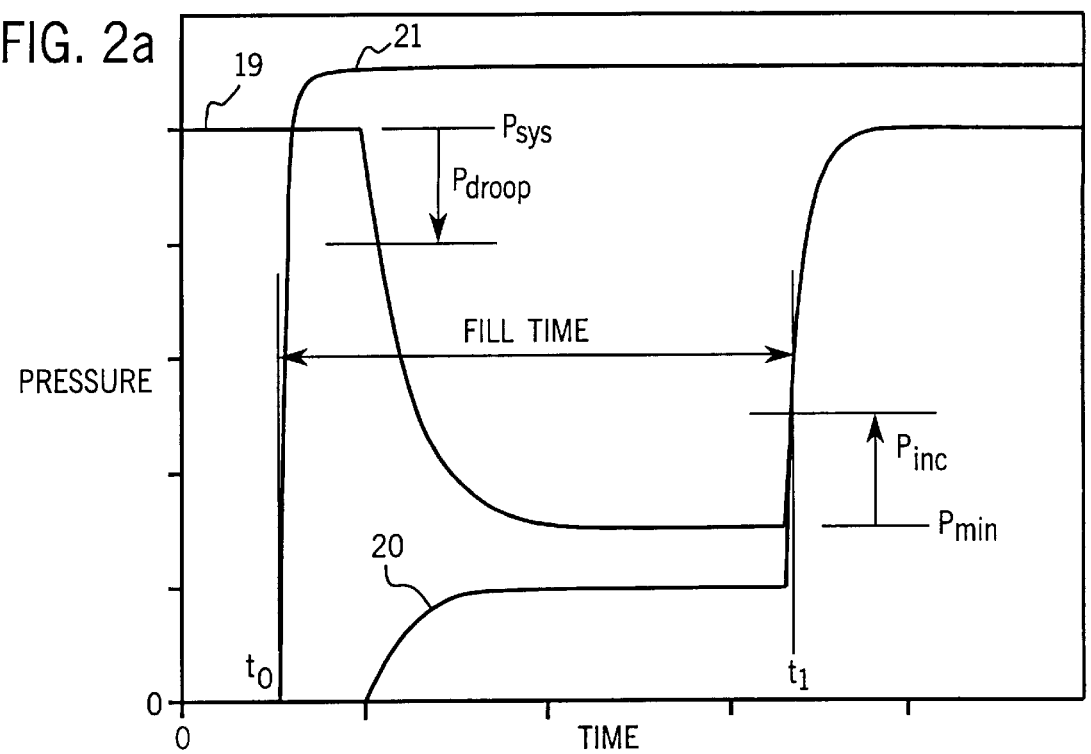
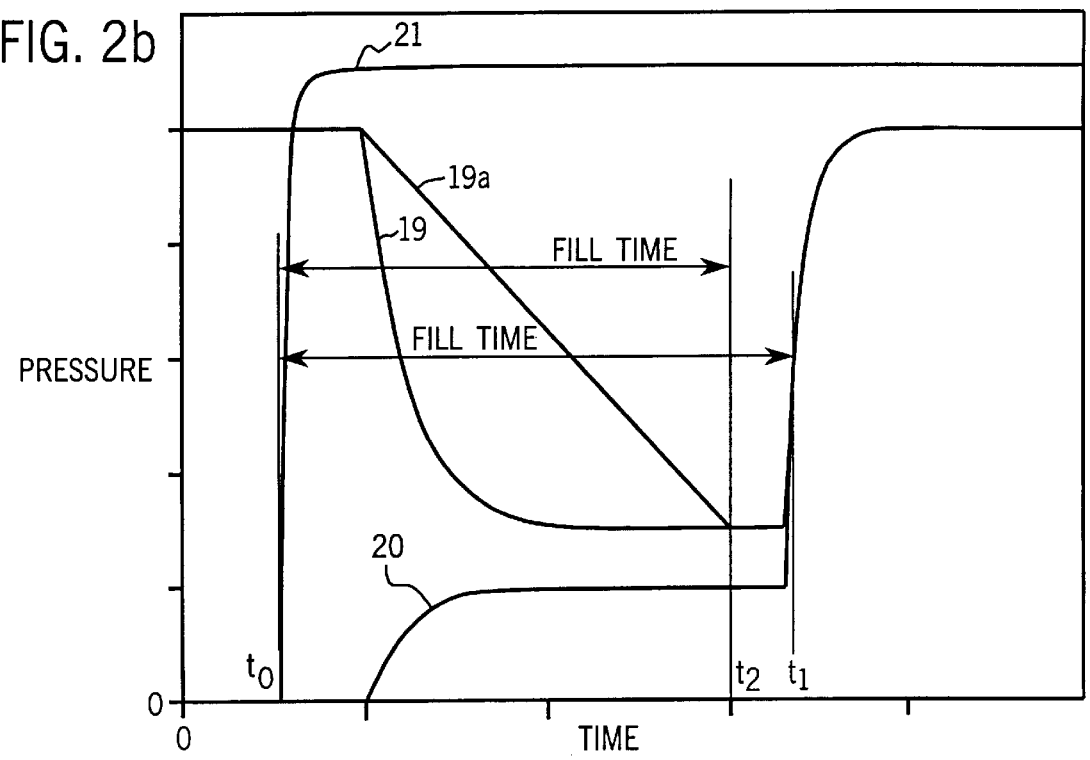

FLOW RESTRICTOR ASSEMBLY IN TRANSMISSION CLUTCH CONTROL SYSTEM

BACKGROUND OF THE INVENTION

The present invention relates generally to control of a power transmission in a work vehicle such as an agricultural tractor. More particularly, the invention relates to an improved flow restrictor assembly for reducing clutch fill rates for clutches incorporated in such transmissions.

In the field of transmission systems for work vehicles, such as agricultural tractors, a number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. The control systems thus cause the clutches to engage and disengage in predetermined combinations to accelerate, decelerate and drive the vehicle as desired by the operator. Transmissions and control systems of this type are described in U.S. Pat. No. 4,425,620, issued on Jan. 10, 1984 and assigned to Steiger Tractor, Inc. at issuance, and U.S. Pat. No. 4,967, 385, issued on Oct. 30, 1990 and U.S. Pat. No. 5,902,344, issued on May 11, 1999, both assigned to Case Corporation at issuance.

Direct shifting between gears is often provided for in transmissions such as those described above. This process, called "power shifting" involves disengaging a first set of one or more clutches (the "off-going clutches") while substantially simultaneously engaging a second set of one or more clutches (the "on-coming clutches"). This is especially valuable when a work vehicle is in forward motion, attached to an implement. Both first and second sets of clutches cannot be engaged at the same time (called "lockup") with the engine rotating the transmission input shaft without causing serious wear and possible damage. On the other hand, if the off-going clutches are disengaged long before the on-coming clutches are engaged, the tractor will be disengaged entirely for a period of time, and will decelerate. This phenomenon is called a "torque-hole" in industry parlance. The optimum situation is to begin engaging the oncoming clutches while the off-going clutches are being disengaged. Thus, as torque applied by the off-going clutches decreases, torque applied by the on-coming clutches increases. This overlap of torques eliminates the torque hole and provides a smoother transition between gears.

It is difficult to properly overlap the torques due to inherent and changeable time delays during clutch engagement and disengagement. Hydraulic clutches must be filled with hydraulic fluid for an initial period ("fill time") before they begin engaging and transmitting torque. Furthermore, clutch valves have a built-in lag from the time they are energized to the time they open and permit fluid to flow. The results is an inherent delay between the time the on-coming clutch valves are signaled to operate, and the time torque begins to be transmitted by the on-coming clutch. One solution to this problem is to monitor the pressure in each clutch as the clutch fills in order to determine the point of incipient engagement, which appears as a sudden pressure spike in the clutch. Measuring the pressure in each clutch requires a pressure transducer for each clutch, however. This adds to the complexity of the system and the likelihood of component failure.

There is a need, therefore, for an improved apparatus for reducing clutch fill times in a controlled manner, especially for clutches in power shift transmissions. In particular, there is a need for an apparatus adapted to limit the rate of flow of hydraulic fluid to clutches to smooth the engagement and disengagement of the clutches. More particularly, there is a need for an apparatus that can modulate clutch fill times while a vehicle is being operated.

SUMMARY OF THE INVENTION

There is provided in accord with the present invention a work vehicle having a transmission and a clutch control system controlling the vehicle clutches, with the clutch control system including a flow restrictor assembly. The flow restrictor assembly comprises a modulator valve and an unloading valve in fluid communication with the fluid supply and the clutch control system. The unloading valve is selectively in fluid communication with the modulator valve through a modulator tank orifice and is responsive to fluid pressure changes acting on the modulator valve, as the clutch control system operates to control the length of time the modulator valve regulates the rate of flow of fluid to the clutch control system through the modulator tank orifice. In one embodiment the unloading valve spool is nested inside the modulator valve spool. The flow restrictor assembly controls the timing of the clutch fill times by varying the sizes of the modulator tank orifice.

BRIEF DESCRIPTION OF THE DRAWINGS

The present invention will become more fully understood from the following detailed description of the preferred embodiment, taken in conjunction with the accompanying drawings, wherein like reference numerals refer to like parts, in which:

FIG. 2a is a diagram of hydraulic pressure curves for the engagement of the clutch of FIG. 1;

FIG. 2b is a diagram of hydraulic pressure curves for the engagement of the clutch with a flow restrictor;

DETAILED DESCRIPTION OF THE PREFERRED EMBODIMENT

Figure 1:
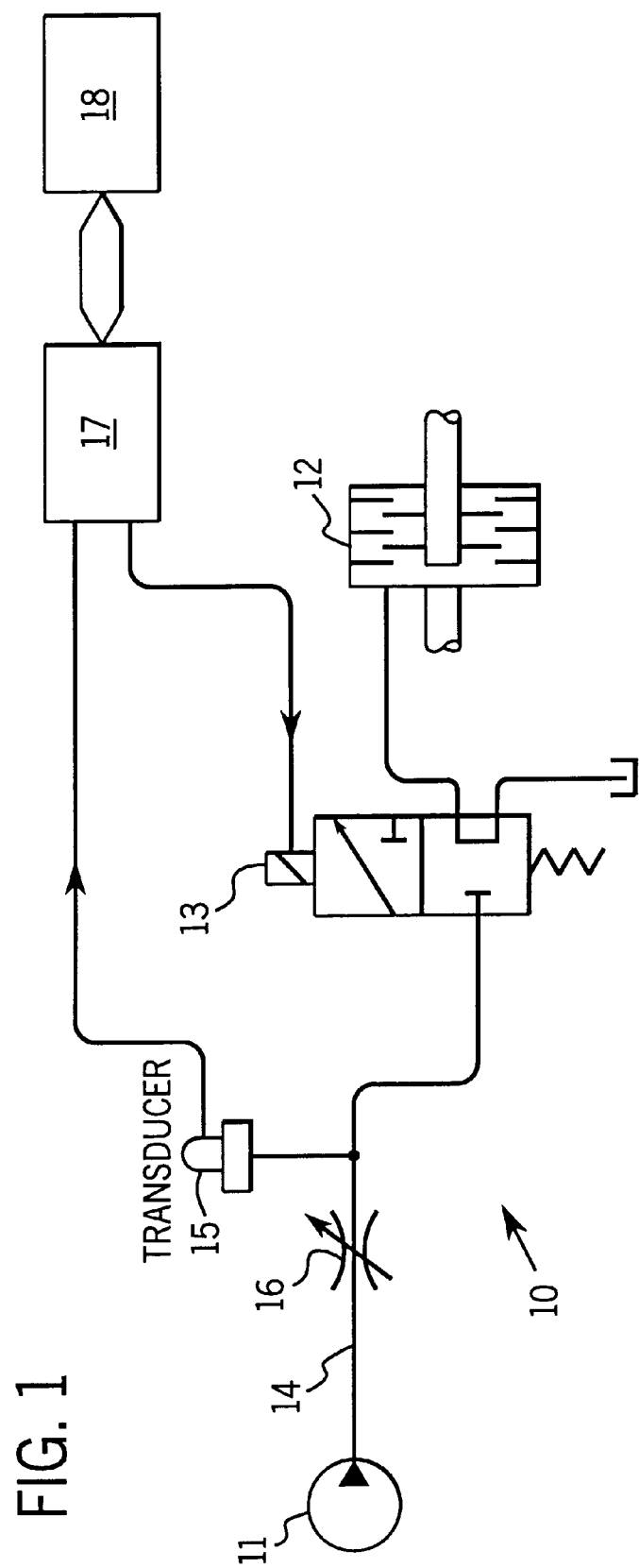
FIG. 1 is a schematic illustration of a clutch fill and calibration apparatus.
Figure 10:
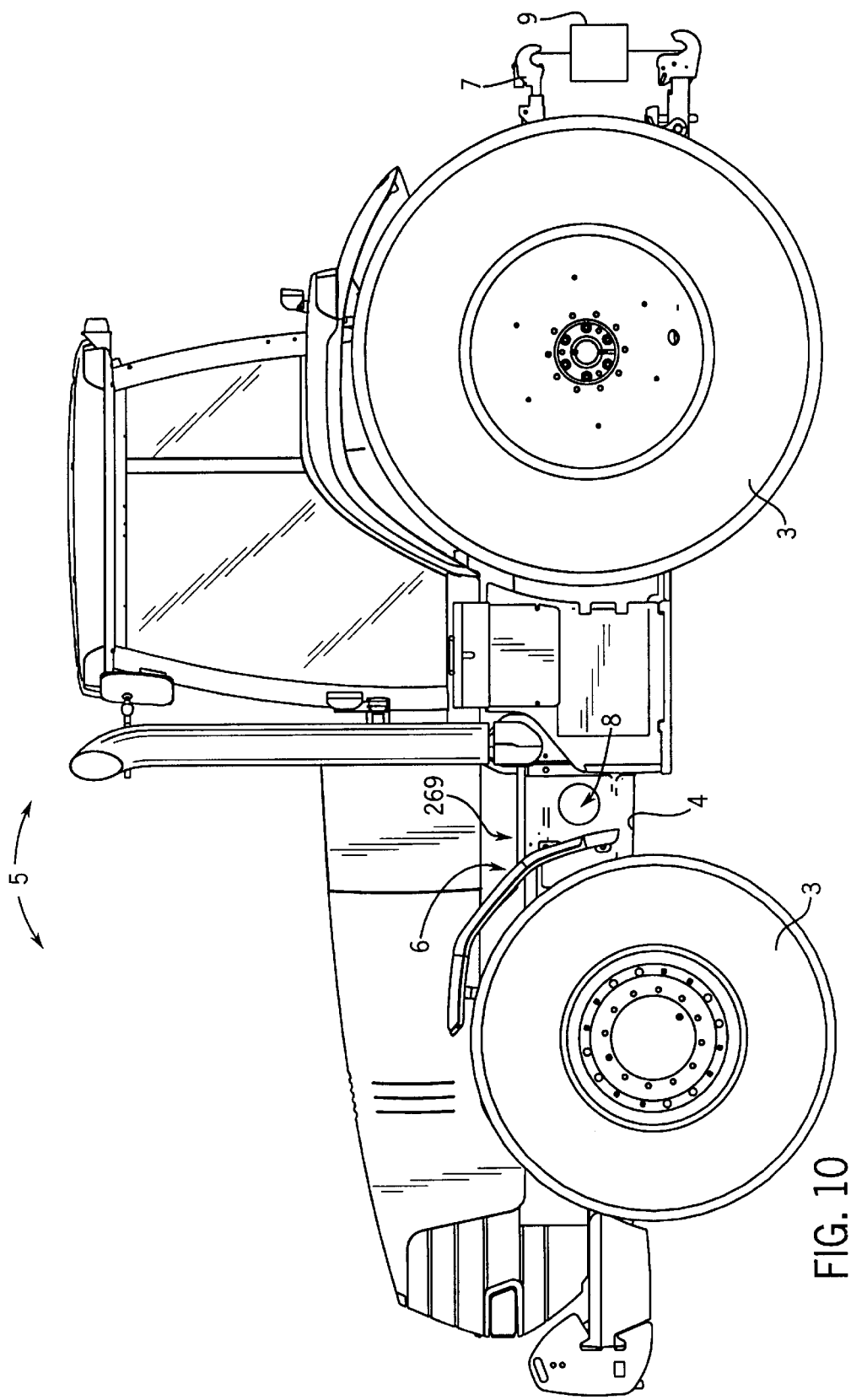
FIG. 10 is a side elevation view of a work vehicle which incorporates a preferred embodiment of the present flow restrictor assembly.

Turning now to the drawings, FIG. 10 illustrates a work vehicle 5 having a vehicle support structure 4 with wheels 3 rotatably mounted on the structure. An engine 6 is mounted on the vehicle support structure 4 and coupled to a transmission as described herein. The engine 6 and transmission can be configured to provide 2 or 4-wheel drive to the vehicle 5. A hydraulic pump 8 can be coupled to the engine 6 to pump fluid to a hydraulic actuator 7, which actuator imparts motion to a tool 9 coupled to the actuator. For example, the tool 9 could be a backhoe attachment and arm or a planter or baler or the like. The work vehicle 5 can be used in the agricultural, industrial and construction industries. The work vehicle 5 could also be an articulated vehicle or a tracked vehicle wherein wheels support the tracks. Shifting of the transmission is facilitated by a clutch and associated equipment as hereinafter described. FIG. 1 illustrates a schematic view of a clutch engagement apparatus 10 connected to a hydraulic supply 11 and clutch 12. Apparatus 10 includes a valve 13 connected to clutch 12. Valve 13, in turn, is connected to hydraulic supply 11 via a second hydraulic conduit 14. Hydraulic conduit 14 is also connected to a pressure transducer 15. A fluid flow restrictor 16 is located in conduit 14 between hydraulic supply 11 and valve 13. A processor 17 is connected to both the valve and the pressure transducer, and communicates with a memory 18.

Clutch 12 is preferably a normally open hydraulic clutch, e.g. one that is engaged by filling with fluid. Valve 13 regulates the flow of hydraulic fluid between the hydraulic supply 11 and clutch 12, and is preferably a solenoid actuated, spring return 3-way valve having an open and a closed position, i.e. opened to allow flow into clutch 12, or de-energized, i.e. closed to allow fluid to flow out of clutch 12. Valve 13 preferably includes a reverse flow preventing check valve in the energized position. This feature of valve 13 effectively prevents back flow through valve 13 in the event pressure supply to valve 13 drops temporarily with valve 13 in its energized state. Pressure transducer 15, disposed between valve 13 and hydraulic supply 11, measures hydraulic pressure in the conduit and produces a signal indicative of this hydraulic pressure. Fluid flow restrictor 16 is disposed in conduit 14 between hydraulic supply 11 and valve 13 to create a drop in hydraulic pressure between hydraulic supply 11 and valve 13 when valve 13 is opened and fluid flows into clutch 12. Pressure transducer 15 is positioned between fluid flow restrictor 16 and valve 13 and thereby indicates this pressure drop during clutch filling. Fluid flow restrictor 16 is shown here as an adjustable orifice, however, a fixed flow restrictor or a flow restrictor in combination with a modulator are also preferred Processor 17 controls the opening and closing of valve 13 by producing a valve opening and a valve closing signal that are communicated to valve 13. Processor 17 also receives the pressure signals generated by pressure transducer 15. Finally, it is adapted to calculate a time value representative of the time delay between valve opening (e.g. the valve opening signal) and incipient clutch engagement. The processor identifies incipient clutch engagement by monitoring pressure signals transmitted by the pressure transducer, and determining when the pressure indicated by those signals rises to a predetermined pressure and/or rises at a predetermined rate. This time delay is then recorded into memory 18. In addition, intermediate driver circuits between processor 17 and valve 13, and between processor 17 and pressure transducer 15 may be employed, as necessary, to amplify or condition the valve opening signal or the transducer signal, respectively. Such driver circuits are known to those skilled in the art. In the presently preferred embodiment, processor 17 is a microprocessor-based digital controller, such as an Intel 80C198 microcontroller and associated control circuitry having appropriate valve drivers and signal conditioning, configured by coded instructions embedded in the processor or the accompanying memory circuit. One or more other processors know to those skilled in the art may be employed in place of processor 17.

In an alternative embodiment a plurality of clutches can be rapidly and sequentially calibrated by connecting a plurality of clutch valves to the outlet of flow restrictor 16 in a manifold arrangement, such that each clutch valve receives fluid from flow restrictor 16. To each of these clutch valves, a clutch is attached to receive fluid from its respective valve. Similarly to FIG. 1, the processor is adapted to control each additional clutch valve. Each clutch may be calibrated by transmitting fluid through flow restrictor 16 and through each clutch valve to each clutch in turn. Since flow goes only a single clutch at a time, the clutch fill delay is indicative of that clutch's fill time. Thus, a single pressure transducer and flow restrictor pair can sequentially calibrate a plurality of valves connected in a manifold arrangement.

To illustrate the FIG. 1 calibration process, several hydraulic pressure curves for the clutch filling calibration process both before and after the opening of valve 13 are shown in FIG. 2a. Curve 19 indicates the pressure at pressure transducer 15. Curve 20 indicates the pressure in clutch 12. Curve 21 indicates the current flowing through the coil of valve 13, which is an indirect indicator of the energization of valve 13. The processor signals valve 13 to open and conduct fluid to clutch 12 at time $t_o$. The current through the coil subsequently increases, and the valve opens. As the valve opens, transducer pressure drops from system pressure $P_{sys}$ to lower pressures $P_{droop}$, indicating that fluid is flowing into the clutch. As the pressure at the transducer drops, pressure in the clutch rises as the clutch fills as indicated by curve 20. The transducer pressure continues dropping, although at a slower rate as the clutch fills and the clutch plates move toward engagement. Finally, a lowermost pressure value is reached, and transducer pressure begins to rise rapidly. This is the point or range of incipient clutch engagement. The processor is adapted to identify incipient engagement when the transducer pressure, after recovering from its initial droop, reaches a predetermined hydraulic pressure and/or predetermined rate of change. This predetermined hydraulic pressure is preferably below the system pressure $P_{sys}$ and above the minimum pressure $P_{min}$. Most preferably, it is a predetermined incremental pressure $P_{inc}$ above the minimum pressure $P_{min}$. The processor may retrieve the predetermined pressure, or the incremental pressure, $P_{inc}$, issued to calculate the predetermined pressure, from memory 18. Alternatively, the predetermined pressure may be a function of the system pressure or the minimum pressure.

Once the predetermined hydraulic pressure is reached, processor 17 calculates the time interval between valve energization and the time the predetermined hydraulic pressure was reached, and saves this value in memory 18 shown in FIG. 1. To calculate the clutch fill time, processor 17 preferably determines the difference between the time at which the clutch began to fill and the time the predetermined hydraulic pressure was attained. Since fluid flow into the clutch is difficult to measure, the processor can more easily determine the beginning of clutch filling indirectly, such as by measuring the current in the coil of valve 13, or recording the time at which the processor signaled valve 13 to open (the preferred method), or recording the time at which the $P_{sys}$ begins dropping. To calibrate the clutch fill times, processor 17 must engage the clutch and simultaneously monitor the pressure measured by pressure transducer 15.

In the event processor 17 is connected to additional clutches in a manner similar to FIG. 1 and the accompanying text, processor 17 may then disengage an additional clutch. By delaying engagement of the off-going clutch until incipient engagement of the on-coming clutch, processor 17 synchronizes clutch engagement and disengagement, and prevents torque holes or transmission lockup. The capability to calibrate clutches while synchronizing engagement and disengagement is of particular value while work vehicle transmissions are power shifted.

Figure 3:
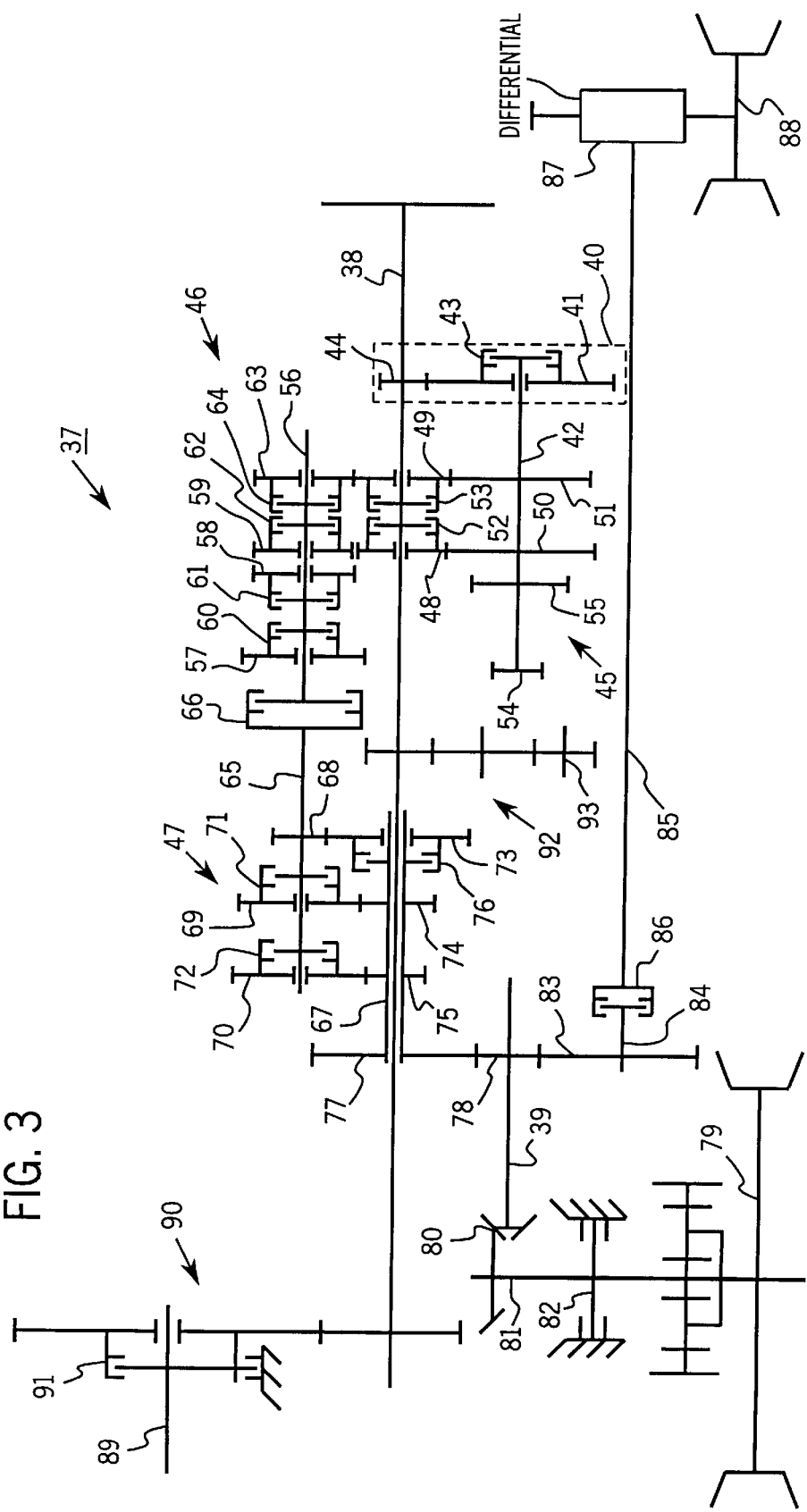
FIG. 3 is a schematic illustration of a power shift transmission.

A preferred multiple clutch power shift transmission for use with hydraulic clutches calibrated as described herein is illustrated in FIG. 3. This transmission is typical of transmissions employed for work vehicles having a plurality of forward and reverse gears, capable of power shifting between forward or reverse gears.

Turning more particularly to the structure and operation of transmission 37, while any one of a variety of transmissions may be controlled, FIG. 3 diagrammatically illustrates the presently preferred configuration. Transmission 37 is of a type known generally as a "powershift transmission," wherein several sets of gears are associated with transmission shafts and certain of the gears may be selectively rotationally fixed with respect to their shafts by engagement of an associated fluid clutch to define desired gear ratios between input shaft 38 and output shaft 39. In the transmission illustrated in FIG. 3, input shaft 38 is driven in rotation by the vehicle engine 6. Gear sets, along with associated fluid clutches and transmission shafts, permit a number of different gear ratio combinations to be defined for driving transmission output shaft 39 at desired speeds as follows.

A creeper gear set 40 includes a creeper gear 41 mounted on and rotational with respect to a second transmission shaft 42. A creeper clutch 43 is engageable to lock creeper gear 41 against rotation on shaft 42. Creeper gear set 40 also includes a gear 44 fixed to shaft 38 and continuously meshing with creeper gear 41. Engagement of creeper clutch 43 results in driving shaft 42 through gears 44 and 41 to obtain an extremely slow output speed of shaft 39. Creeper gear set 40 may be optionally excluded from transmission 37.

Transmission 37 includes three groups of gear sets, identified in FIG. 3 by the reference numerals 45, 46 and 47. First group 45 includes first and second gears 48 and 49 supported on and rotational with respect to shaft 38. Additional gears 50 and 51, fixed on second shaft 42 mesh continuously with gears 48 and 49, respectively. Fluid clutches 52 and 53 are associated with gears 48 and 49, respectively, and may be engaged to lock their associated gear against rotation on shaft 38. In operation, either clutch 52 or clutch 53 is engaged to obtain an input-to-output gear ration, or both clutches may be released or disengaged to interrupt the transmission of power to shaft 42. In the preferred embodiment shown, gear combination 48 and 50 define a ratio 34:39, while gears 49 and 51 have a ratio of 37:37.

Second gear set group 46 includes gear 50, as well as to additional gears 54 and 55, all fixed on second shaft 42. Supported on a third transmission shaft 56 and rotational with respect to third shaft 56, three gears 57, 58 and 59 mesh continuously with gears 54, 55 and 50, respectively (actual meshing is not shown in FIG. 3). Fluid clutches 60, 61 and 62 are associated with gears 57, 58 and 59, respectively, and may be engaged to lock the associated gear against rotation on shaft 56. Thus, either one of clutches 60, 61 or 62 may be engaged to transmit power between second shaft 42 and third shaft 56, or all of the clutches may be released to interrupt power transmission between the shafts. In the preferred embodiment illustrated, gear combination 54 and 57 provide a gear ratio of 29:44, combination 55 and 58 provide a ratio of 34:39, and combination 50 and 59 provide a ratio of 39:34.

A reverse gear set is provided adjacent to second gear set group 49 on shaft 56, and includes a reverse gear 63 mounted on and rotational about shaft 56. A reverse clutch 64 is associated with reverse gear 63 and may be engaged to lock reverse gear against rotation with respect to shaft 56, placing transmission 37 in one of several reverse gear ratios.

Third shaft 56 is aligned with and may be selectively coupled to a fourth transmission shaft 65 via a master clutch 66. Thus, when master clutch 66 is fully engaged, shaft 65 rotates at the same speed and in the same direction as shaft 56. As discussed below, master clutch 66 is preferably modulated into and out of engagement, such as by pulse-width-modulating a proportional directional control valve. However, master clutch 66 may be mechanically or electro-mechanically modulated by techniques well known in the art.

Third gear set group 47 selectively couples shaft 65 with a further shaft 67 disposed about shaft 38. Third gear set group 47 includes a first gear 68 fixed to shaft 65, and a pair of gears 69 and 70 supported on and rotational with respect to shaft 65. Clutches 71 and 72 are associated with gears 69 and 70, respectively, and may be engaged to lock the associated gear against rotation on shaft 65. Gears 68, 69 and 70 mesh continuously with corresponding gears 73, 74 and 75, respectively, on shaft 67. Gear 73 is supported on and rotational with respect to shaft 67, whereas gears 74 and 75 are fixed to shaft 67. A fluid clutch 76 is associated with gear 73 and may be engaged to lock gear 73 against rotation on shaft 67. Thus, by selectively engaging either clutch 71, 72 or 76, shaft 67 is caused to rotate at a predetermined speed ratio as shaft 65 is driven in rotation. In the presently preferred embodiment, gear combination 68 and 73 provide a gear ratio of 22:54, combination 69 and 74 provide a ratio of 37:39, and combination 70 and 75 provide a ratio of 52:24.

Shaft 67 transmits power to transmission output shaft 39 through gears 77 and 78, fixed on shafts 67 and 39 respectively and arranged to continuously mesh with one another. As illustrated in FIG. 3, output shaft 39 transmits power to rear axle 79 through bevel gears 80 arranged to drive a differential input shaft 81. A master brake 82 is provided on shaft 81 for braking vehicle 10. In addition to driving rear axle 79, in the preferred embodiment illustrated in FIG. 3, gear 78 carried by output shaft 39 meshes with a further gear 83 supported on a front wheel drive clutch shaft 84. A front wheel drive shaft 85 may be selectively coupled to clutch shaft 84 by front wheel drive clutch 86, and extends to front wheel drive differential 87 for driving front axle 88.

In addition to the gearing described above, transmission 37 is preferably arranged for driving power take off shaft 89 via power take off gearing 90, including power take off clutch 91. Transmission 37 also includes gearing, designated generally by the reference numeral 92, for driving a hydraulic pump drive shaft 93 coupled to the hydraulic pump 8.

The clutches contained in transmission 37 are preferably fluid clutches of a type known in the art. Such clutches are typically biased in a disengaged position and engageable by the application of pressurized fluid. Clutches 52, 53, 60, 61, 62, 64, 71, 72 and 76 in the presently preferred embodiment are engaged by hydraulic valves that are either on or off, and are operated by shifting them directly between pressure transmitting ("on") and pressure relieving ("off") positions. such valves have a single engagement flow rate, and thus a single clutch fill time calibration value. Proportional hydraulic valves, for example, may also be employed in transmission 37. These valves are unlike on/off valves, in that proportional hydraulic valves provide a plurality of flow rates, and thus fill times. The plurality of flow rates are provided by modulating the valves into and out of engagement. For such valves, flow rate magnitude is a function of the input signal magnitude. In other words, for input signals of different magnitudes, a proportional hydraulic valve will provide different flow rates (and thus different clutch fill times). Such valves can therefore be calibrated according to the present invention, but the fill rate calibration will be a function of the input signal applied to such valve. the valve supplying master clutch 66 is an exception to the above. To permit smooth transitions in shifting, master clutch 66 is preferably modulated into and out of engagement by proportional current modulating a proportional directional control valve connected to master clutch 66. This is especially important when the work vehicle is stopped and the operator is shifting from neutral into a forward or reverse gear.

Several modes of shifting are possible with transmission 37. "Power shifting", e.g. direct shifting between selected gears when the vehicle is already engaged and moving in a particular direction without operating master clutch 66 may be performed by disengaging outgoing clutches (corresponding to the gear ratio being shifted from) while engaging incoming clutches (for the gear ratio being shifted to), in a coordinated and timed manner. "Skip shifting" is the technique of shifting between two different gear ratios, while skipping intermediate gear ratios. "Modulated shifting" is the technique of disengaging master clutch 66, disengaging the current gear ratio, engaging a desired gear ratio, then modulating the engagement of master clutch 66. Such modulated shifting is extremely useful in certain shifting situations, such as starting from a stop and shuttle shifting between forward and reverse gear ratios.

By engaging combinations of clutches, transmission 14 establishes a number of predetermined gear ratios between input shaft 38 and output shaft 39. The first group includes clutches 52, 53, and 43. The second group includes clutches 60, 61, 62, and 64. The third group includes clutches 71, 72, and 76. Furthermore, for forward gear ratios, only one clutch of each gear set group 45, 46, 47 is engaged. Similarly, for reverse gear ratios, the reverse gear clutch 64 is engaged along with a clutch from the first and third gear set groups 45 and 47. Moreover, for creeper gear ratios, the creeper clutch 43 is engaged along with a clutch from the second gear set group 46 (or the reverse gear clutch 64) and a clutch from the third gear set group 47. For transmission of power through transmission 37, all the gear combinations require the engagement of master clutch 66.

Transmission 37 has thirteen clutches. In order to provide a plurality of forward and reverse gear ratios, several clutches must be simultaneously engaged. Each of the clutches providing forward and reverse gear ratios may be operated during power shifting, and thus should be calibrated regularly. To provide for calibration of these clutches, pressure sensors and flow restrictors are provided as shown in FIG. 4.

Figure 4:
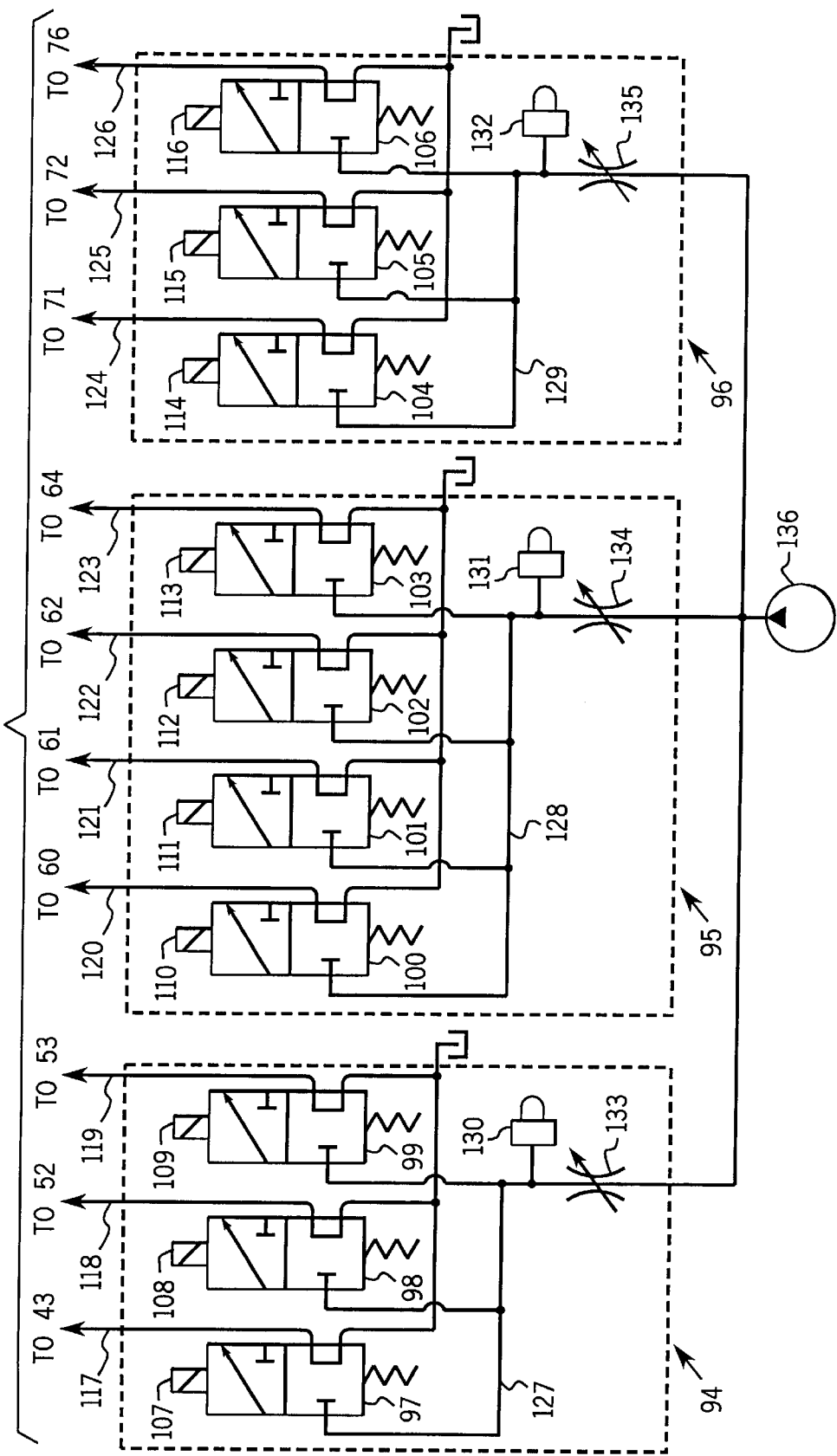
FIG. 4 is a schematic illustration of a manifold apparatus for calibrating clutch fill times for use with the transmission of FIG. 4.
Figure 5:
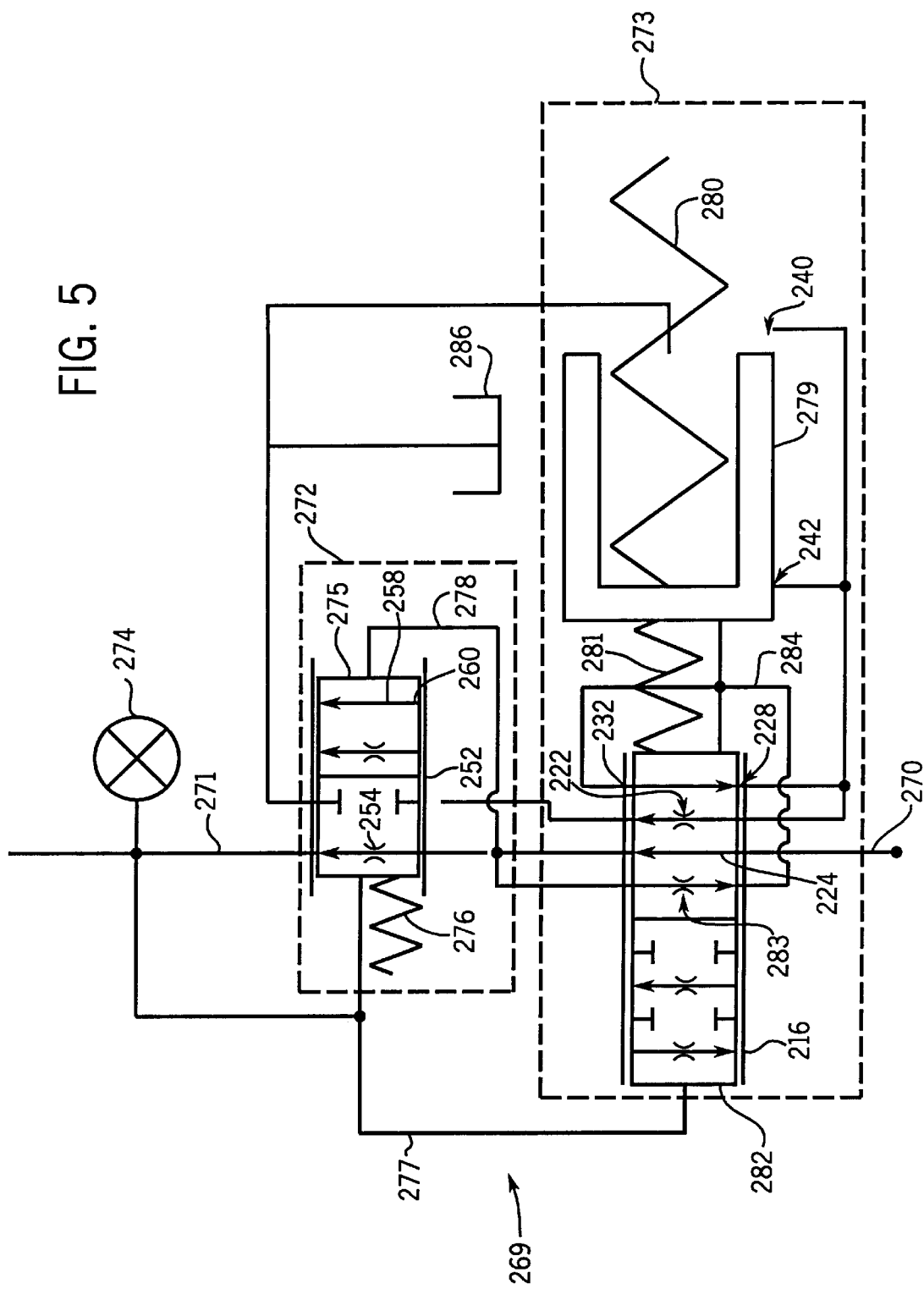
FIG. 5 is a schematic illustration of the flow restrictor for the manifold apparatus of FIG. 4.
Figure 6:
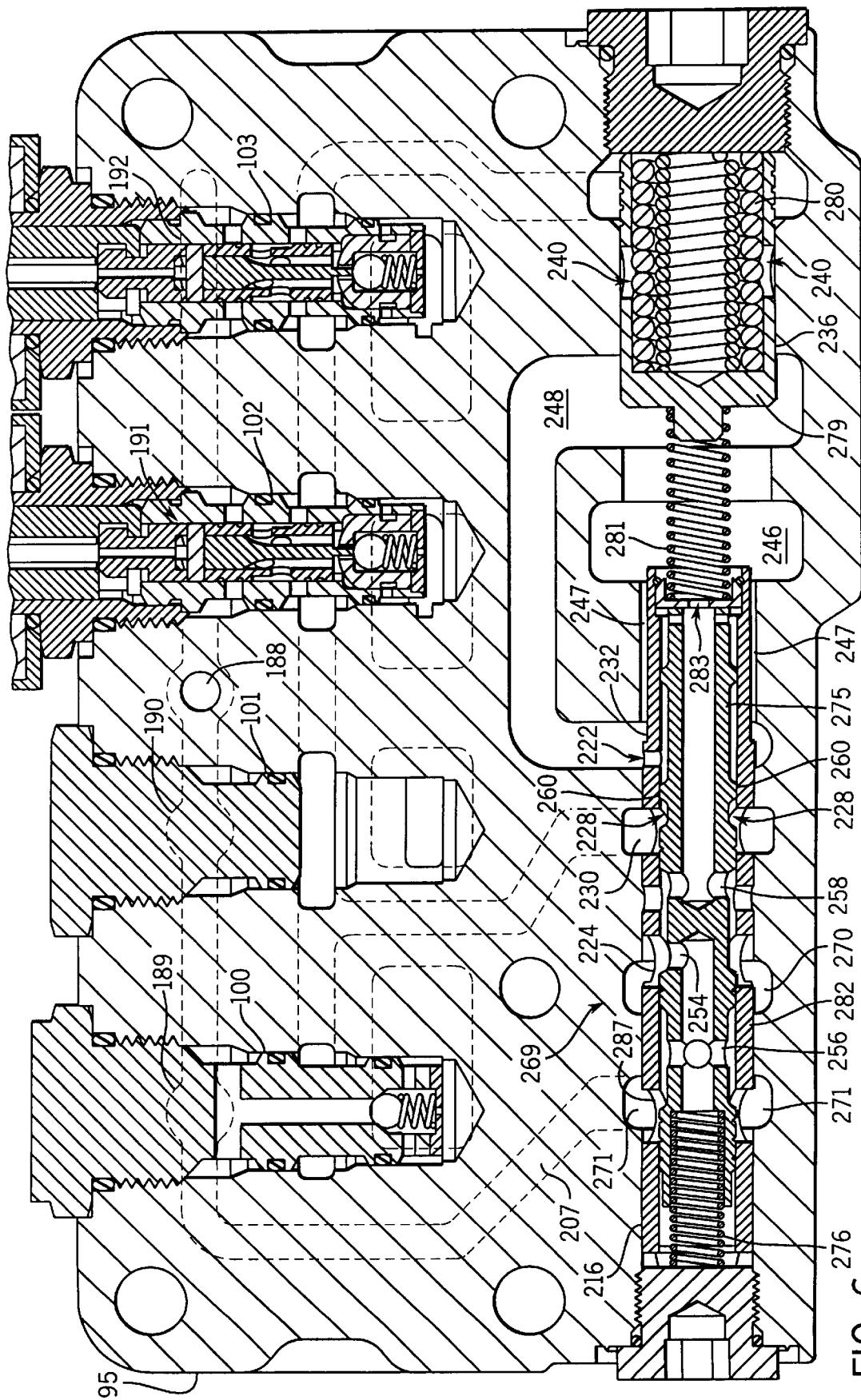
FIG. 6 is a partial cross-sectional view of the manifold apparatus of FIG. 4 incorporating an embodiment of the flow restrictor of FIG. 5 before a shift of the transmission.
Figure 7:
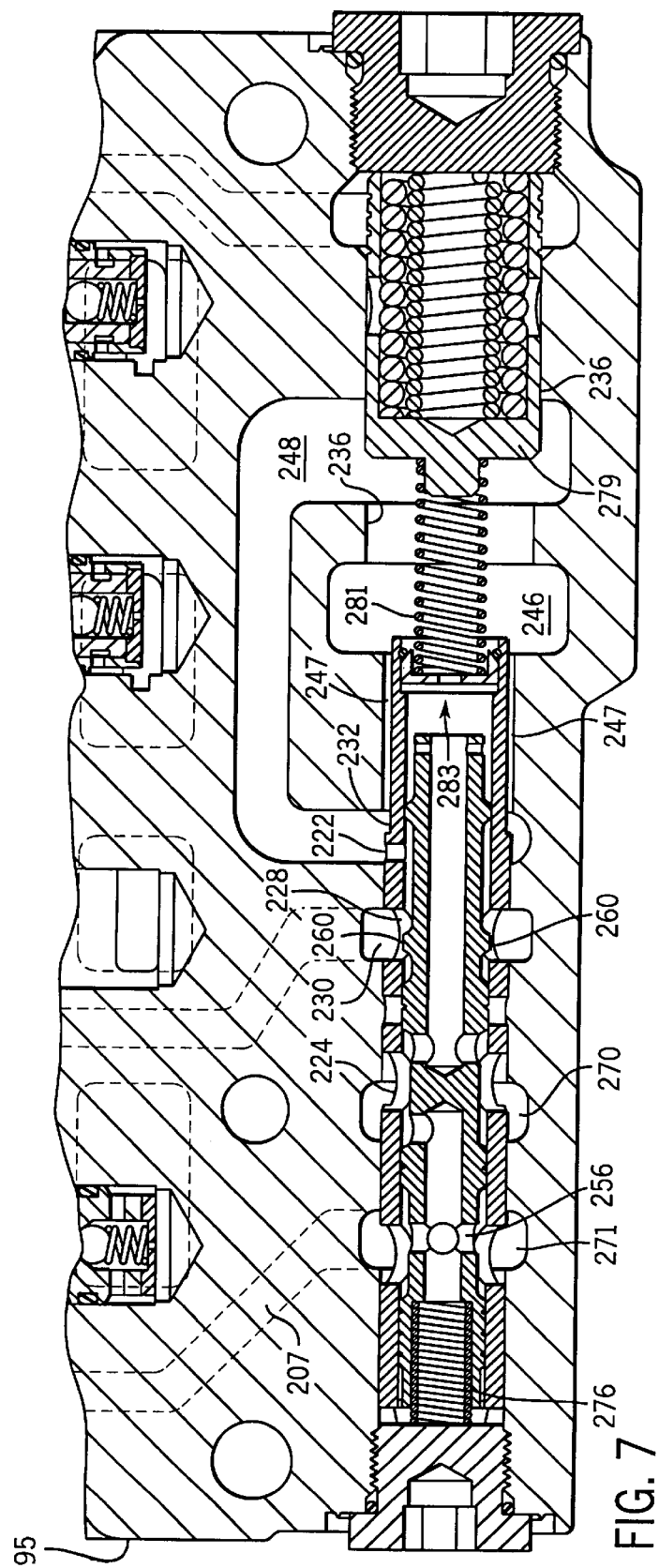
FIG. 7 is a partial cross-sectional view of the manifold apparatus of FIG. 4 incorporating a preferred embodiment of the flow restrictor assembly of FIG. 5 at the beginning of the clutch fill, with the unloading spool to the left.
Figure 8:
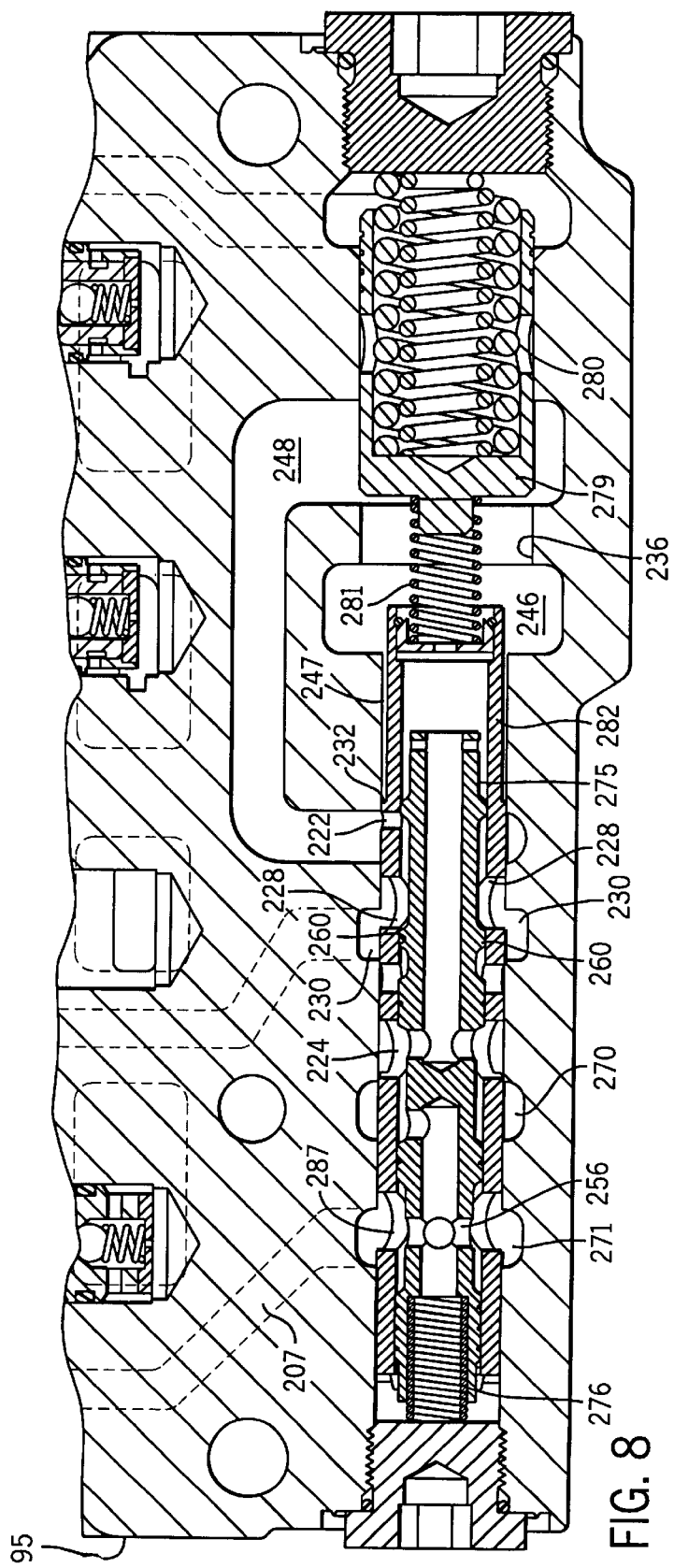
FIG. 8 is a partial cross-sectional view of the manifold apparatus of FIG. 4 incorporating a preferred embodiment of the flow restrictor assembly of FIG. 5 at the end of the clutch fill, with the unloading spool to the left and the modulator spool to the right.
Figure 9:
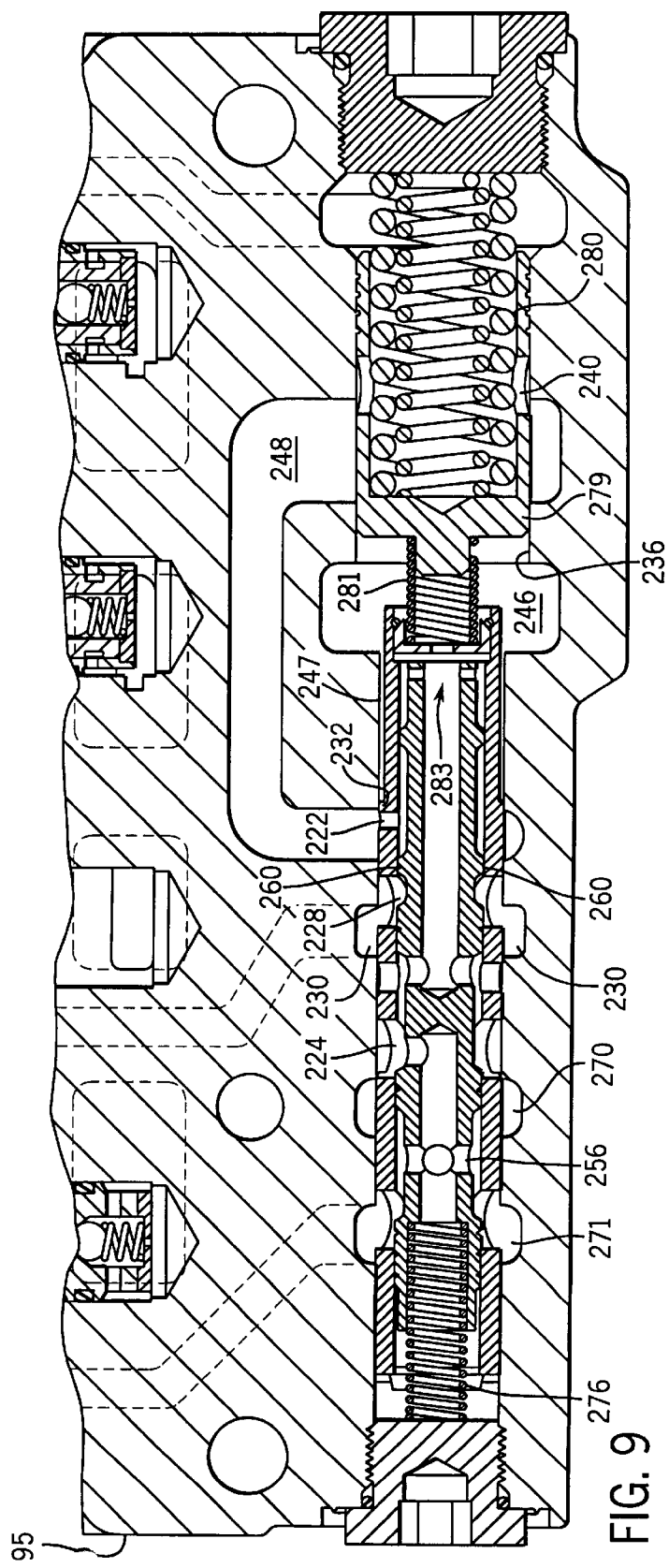
FIG. 9 is a partial cross-sectional view of the manifold apparatus of FIG. 4 incorporating a preferred embodiment of the flow restrictor assembly of FIG. 5 after the clutch is full, with the unloading spool moved to the right and closing fluid flow through the modulator tank orifice.

FIG. 4 illustrates such a valve body arrangement for the valves associated with the three groups of clutches. Three valve bodies 94–96, include ten clutch valves 97–106, having valve solenoids 107–116 and output lines 117–126, respectively. Clutch valves 97–106 control clutches 43, 52, 53, 60, 61, 62, 64, 71, 72, and 76, respectively, by regulating the flow of hydraulic fluid to the clutches through output lines 117–126. The hydraulic supply sides of clutch valves 97–99, clutch valves 100–103, and clutch valves 104–106 are joined to common manifolds 127–129, respectively. Pressure transducers 130–132 are also connected to the valve bodies and are adapted to sense pressure in manifolds 127–129, respectively. Flow restrictors 133–135 are joined to manifolds 127–129, respectively, and to hydraulic supply 136.

For any of the gear ratios, only one clutch in each group need be engaged simultaneously. Therefore only one clutch valve in each of the valve bodies need be energized simultaneously to perform any shift. Accordingly, the pressures transducers on each valve body are capable of calibrating the fill times of every clutch during every shift, since the pressure drop measured by each pressure transducer during any clutch engagement will be a function of the fill time of a single clutch. By sensing pressure changes at the inlet side of the clutch valves, rather than the pressure at each clutch, the number of pressure transducers required to calibrate the clutches can be reduced.

To engage the clutches, the appropriate solenoids are energized, opening a passage between the inlet side of the valves and the output lines, thereby allowing the passage of hydraulic fluid to the clutches. The fluid passes from the hydraulic supply, through the flow restrictors, into the manifolds, through the valves, through the output lines and into the clutches. The pressure transducers are positioned to provide a signal indicative of the pressure in their respective manifolds.

Valves 97–106 are preferably solenoid valves, having an "on" position, in which the valves are completely open, allowing flow from the hydraulic supply to their respective clutches, and an "off" position in which their respective output lines are disconnected from manifold 95 and are connected to a tank. Moreover, valves 97–106 preferably include reverse flow preventing check valves as indicated schematically in FIG. 4 for preventing pressure from being relieved from the clutches in the event pressure supply to a valve falls temporarily when the valve is in its energized state. Cartridge valves having a thread diameter of between $\frac{3}{8}$ and 1.5 inches are preferred. To provide the pressure transducer with the optimum sensible pressure drop upstream of valves 97–106, valves 97–106 must permit sufficient flow to fill their respective clutches, yet not generate a large pressure drop themselves. For this reason, each valve preferably should be selected to provide a hydraulic fluid flow rate of between 1 and 12 gallons per minute when a pressure differential of 300 kPa is applied across that valve. More preferably, each valve should provide a flow rate of 1.5 to 10 gallons per minute when a pressure differential of 300 kPa is applied across that valve. Most preferably, each valve should provide a flow rate of 2 to 8 gallons per minute when a pressure differential of 300 kPa is applied across that valve. The 300 kPa differential pressure mentioned here is used as a standard for determining the flow capacity of the valves. The actual pressure differential across the valves when in use may not be 300 kPa. Flow restrictors 133–135 may be simple orifices as shown here. It is more preferable, however, that they be adjustable. Most preferably the flow restrictor is a modulated flow restrictor assembly of the type disclosed in FIGS. 5–9 and the accompanying text.

A simple flow restrictor, such as the orifice 16 in the FIG. 1 clutch calibration apparatus is sufficient to calibrate the fill time of a clutch. When such a devise is used in a work vehicle for calibrating transmission clutches during actual operation of the vehicle. However, a fixed orifice may cause too-rapid gear engagement and gear banging. Preferably, a flow restrictor adapted to allow calibration of a transmission during operation modulates hydraulic fluid flow to a clutch valve as the clutch fills, reducing flow substantially at the point of incipient engagement to prevent such damage. By way of modification, therefore, flow restrictors 16 and 133–135 may be replaced by flow restrictor assembly 269 disclosed in FIGS. 5, 6, 7, 8, and 9. Flow restrictor 269 has an inlet 270, an outlet 271, an unloading valve 272, and a modulator valve 273. Hydraulic fluid is supplied to inlet 270, and outlet 271 is connected to the inlet of the clutch valve (not shown). This embodiment is a hydro-mechanical modulator, responsive to changes in pressure or flow.

Unloading valve 272 is a spool valve 275, having an orifice 254 for restricting hydraulic fluid flow during the initial portion of the clutch filling process. Hydraulic fluid flowing through orifice 254 creates a pressure drop across the orifice that is monitored by the pressure transducer 274. Unloading valve 272 includes a spool 275 and a spring 276 and is mounted in an unloading spool bore 252. The unloading valve is responsive to the pressure at outlet 271, as shown by the connection of pilot line 277 to a first end of unloading valve 272. Unloading valve 272 is also responsive to the hydraulic pressure between modulator valve 273 and unloading valve 272 (called the "check pressure"), as shown by the connection of pilot line 278 to a second end of the unloading valve. The unloading valve unloads modulator valve 273 and controls the length of time the modulator spool 282 regulates the rate of flow of fluid to the clutch control system through the modulator tank orifice 222, which will be explained below.

Modulator valve 273 includes modulator piston 279, with the modulator piston 279 having a piston tank orifice 240, modulator piston spring 280, check pressure spring 281, modulator valve spool 282, and an unloading orifice 283. Modulator valve 273 is responsive to the pressure at the outlet, as shown by the connection of pilot line 277 to a first end of modulator valve 273. The modulator valve spool 282 is reciprocally mounted in a modulator bore 216 and the modulator spool 282 has a spool tank land 232 near one end which defines a tank channel 247 between the modulator spool 282 and the modulator bore 216. The tank channel 247 and a modulator tank orifice 222 provides selective fluid communication between a piston tank chamber 246 and a piston area tank chamber 248. Fluid can selectively move from the piston tank chamber 246 and the piston area tank chamber 248 through the tank channel 247 and the modulator tank orifice 222 to the modulator tank conduit 230 by way of the modulator tank outlet 228. Modulator valve 273 is also responsive to the check pressure, as shown by the connection of pilot pressure line 284 to a second end of modulator valve 273 through unloading orifice 283.

The modulator valve 273 and the unloading valve 272 cooperate in the following manner. When the clutch valve connected to the outlet are closed, there is no hydraulic fluid flow through orifice 254, and thus no pressure drop across the orifice. The check pressure and the solenoid supply pressure are therefore the same. Since these two pressures act simultaneously on opposing ends of valve spools 275 and 282, they balance, and the spools assume the positions shown in FIG. 6 due to the operation of springs 276, 280, and 281. When a clutch valve connected to the outlet of flow restrictor 269 is opened, fluid flows into the valve and the pressure at outlet 271 drops. This unbalanced pressure causes unloading valve spool 275 to shift to the left, thereby connecting unloading line to tank 286 through modulator tank orifice 222 and the tank channel 247. As a result of this unloading, pressure on modulator piston 279 drops, and modulator piston spring 280 impels the modulator piston toward modulator valve spool 282, compressing check pressure spring 281. Hydraulic fluid is metered through unloading orifice 283, and escapes around the edge of modulator spool 282 into line 230 and thence to tank 286. The action of opposing springs 280 and 281 serve to maintain piston 279 in a constant position, and thus to maintain a constant and reduced check pressure on the right-most end of modulator valve spool 282. This a reduced pressure does not shift modulator valve spool 282 rightwardly, however, because pressure on the leftmost end of the spool is reduced, due to the pressure drop across orifice 254. Thus full flow through modulator valve 273 is maintained during the initial clutch filling period.

When the clutch is substantially filled with fluid, however, hydraulic fluid flow rate to the clutch essentially stops, decreasing from several gallons per minute to a few milliliters per minute, and generates a sudden pressure increase as the clutch piston stops moving and the various hydraulic components downstream of the valve begin to flex outwardly. This appears as a rapidly rising pressure at outlet 271. To prevent a too-rapid pressure rise, possible gear banging and potential damage to the clutches and gears, flow restrictor 269 responds to this reduced flow and increased pressure and substantially restricts hydraulic fluid flow, limiting the maximum rate of hydraulic pressure increase at the outlet of the modulator.

When the unloading spool 275 shifts to the left (FIG. 7) the unloading spool tank land 260 opens past the modulator tank outlet orifice 228 in the modulator spool 282. The fluid that is holding the modulator piston 279 to the right is now allowed to flow through the modulator spool tank orifice 222. The rate at which the fluid is allowed to flow to tank 286 determines how long the fill of the clutch is allowed at a higher-pressure level. The larger the modulator tank orifice 222, the faster the rate. A balance between the fluid pressure on the modulator spool 282 and modulator piston 279 and the bias of the springs 280 and 281 on the spool and piston is achieved. If the modulator tank orifice 222 is smaller, the amount of time required to flow the fluid from the piston tank chamber 246 and piston area tank chamber 248 is longer and pressure on the right side of the modulator spool 282 is higher. The smaller the modulator tank orifice 222 is the longer time it will take for the hydraulic fluid to flow through the tank orifice before the modulator spool 282 will begin to throttle the inlet fluid flow. The optimized size of the modulator tank orifice 222 will allow hydraulic fluid flow through the tank orifice 222 for the time period needed to reduce the pressure on the modulator piston to zero just before the clutch is full. Such condition assures that the clutch will begin its modulation from the lowest possible fluid pressure and thereby allow smooth engagement of the clutch. For the range of clutch sizes commonly used in work vehicles, the modulator tank orifice 222 should be between 0.030 inches and 0.250 inches (0.80 millimeters and 6.00 millimeters). The preferred embodiment provides a modulator tank orifice 222 sized between 0.075 inches and 0.080 inches or a nominal 2.00 millimeters. Flow restrictor 269 reduces flow in the following manner. As the initial pressure increase appears at the outlet, the pressure begins rising in pilot line 277. Increasing pressure in line 277, combined with the spring force of spring 276 applied to the leftmost end of unloading spool 275 overcomes the force applied by hydraulic fluid in pilot line 278 acting on the rightmost end of unloading valve spool 175, and the spool shifts to the right, with the lands 260 and 232 blocking off the fluid flow through orifice 222 and channel 247 to tank 286. See FIG. 9.

As the pressure at the outlet further increases, the pressure increases in pilot line 277 and shifts modulator valve spool 282 to the right, substantially cutting off flow through spool 282. The modulator valve acts as a flow restrictor, allowing limited flow, typically on the order of a few milliliters per minute to fill the clutch, thereby providing a restriction much greater than the restriction provided by orifice 254. By proper selection of orifice 222 and springs 280 and 281, the slope of the rising clutch pressure curve (See FIG. 2b) can be tailored to provide for clutch engagement sufficiently gradual to avoid damage to the transmission. Line 19a on FIG. 2b depicts the pressure for a modulator tank orifice 222 sized to reduce the time required to fill the clutch and not damage the clutch or cause banging of the clutch.

FIGS. 6–9 illustrate a cross-sectional view of an integral valve body 95 and valves 100–103, the valve body having flow restrictor 269 rather than the variable orifice shown in FIG. 4. The operation of flow restrictor 269 is described. FIGS. 6–9, however, show the preferred configuration of valve body 95 as a unitary structure with integral manifold 207, valves 100–103 and flow restrictor 269. Flow restrictor 269 is here shown in its preferred embodiment having concentric nested unloading and modulator valve spools 275, 282 with orifice 222 formed in the modulator spool 282. Manifold 207 connects the inlets of valves 100–103 to the outlet 271 of flow restrictor 269. Pressure transducer 131 (not shown) is fluidly coupled to port 188 and is configured to sense hydraulic pressure in the manifold. Flow restrictor 269 is most effective when tailored for a particular initial flow rate. Additional flow restrictors, here embodied as orifices 189–192 (indicated by dashed lines) at the inlet of valves 100–103, respectively, are configured to reduce fluid flow from the manifold to individual clutches when the clutches are being rapidly filled with fluid, thereby providing a substantially constant flow rate into each clutch during the initial clutch filling period. The FIGURES depict a valve body which includes valves 100–103, none of which are simultaneously energized to open and fill more than one clutch at a time in order to provide the gear ratios desired. Valve bodies 94, and 96 (not shown) are similarly arranged to the FIGURE valve body 95 differing only in the number of valves attached to the valve bodies. Valve bodies 94 and 96 have three valves each. With the above valve body arrangement, each clutch engageable in power shifting may be individually calibrated during each shift during actual operation of the vehicle.

Other substitutions, modifications, changes and omissions may be made to the design and arrangement of the preferred embodiment without departing from the spirit of the invention as expressed in the appended claims.

What is claimed is:

1. A work vehicle comprising:
   a vehicle support structure;
   a plurality of wheels rotatably mounted on the vehicle support structure;
   an engine mounted on the vehicle support structure;
   a transmission mounted on the vehicle support structure and operatively coupled to the engine and at least two wheels, with the transmission engagable in a plurality of gear ratios with a clutch control system controlling a first clutch and at least a second clutch including a flow restrictor assembly, the flow restrictor assembly comprising:
      a manifold fluidly coupled to the clutch control system to conduct fluid from a fluid supply to the first and second clutches, with the manifold having a modulator bore and a piston bore each in fluid communication with the fluid supply and the clutch control system;
      a modulator spool reciprocally mounted in the modulator bore with the modulator spool having an axial, longitudinal unloading spool bore substantially throughout the modulator spool length and having a modulator tank orifice;
      a piston reciprocally mounted in the piston bore and operatively connected on one end, by a spring connector, to the modulator spool and biased by a piston spring on the other end; and,
      an unloading spool reciprocally mounted in the unloading spool bore, thereby nested inside the modulator spool with the unloading spool selectively in fluid communication with the modulator spool through a modulator tank orifice and biased on one end by an unloading spool spring, with the unloading spool responsive to fluid pressure changes acting on the modulator spool, as the clutch control system operates, to control the length of time the modulator spool regulates the rate of flow of fluid to the clutch control system through the modulator tank orifice;
   a hydraulic pump coupled to the engine;
   a hydraulic actuator mounted on the vehicle support structure and connected to a hydraulic pump; and
   a tool mounted on the vehicle support structure and coupled to the hydraulic actuator which imparts motion to the tool.

2. The work vehicle of claim 1, wherein the modulator tank orifice is sized between 0.030 inches and 0.250 inches.

3. The work vehicle of claim 2, wherein the modulator tank orifice is sized between 0.075 inches and 0.080 inches.

4. The work vehicle of claim 1, wherein the modulator tank orifice is sized between 0.80 millimeters and 6.00 millimeters.

5. The work vehicle of claim 4, wherein the modulator tank orifice is sized at a nominal 2.00 millimeters.

6. In a vehicle having a power shift transmission engageable in a plurality of gear ratios with a clutch control system controlling a first clutch and at least a second clutch including a flow restrictor assembly, the flow restrictor assembly comprising:
   a manifold fluidly coupled to the clutch control system to conduct fluid from a fluid supply to the first and second clutches, with the manifold having a modulator bore and a piston bore each in fluid communication with the fluid supply and the clutch control system;

a modulator spool reciprocally mounted in the modulator bore with the modulator spool having an axial, longitudinal unloading spool bore substantially throughout the modulator spool length and having a modulator tank orifice;

a piston reciprocally mounted in the piston bore and operatively connected on one end, by a spring connector, to the modulator spool and biased by a piston spring on the other end; and an unloading spool reciprocally mounted in the unloading spool bore, thereby nested inside the modulator spool with the unloading spool selectively in fluid communication with the modulator spool through a modulator tank orifice and biased on one end by an unloading spool spring, with the unloading spool responsive to fluid pressure changes acting on the modulator spool, as the clutch control system operates, to control the length of time the modulator spool regulates the rate of flow of fluid to the clutch control system through the modulator tank orifice.

7. The flow restrictor assembly of claim 6, wherein the modulator tank orifice is sized between 0.030 inches and 0.250 inches.

8. The flow restrictor assembly of claim 7, wherein the modulator tank orifice is sized between 0.075 inches and 0.080 inches.

9. The flow restrictor assembly of claim 6, wherein the modulator tank orifice is sized between 0.80 millimeters and 6.00 millimeters.

10. The flow restrictor assembly of claim 9, wherein the modulator tank orifice is sized at a nominal 2.00 millimeters.

11. In a vehicle having a power shift transmission engageable in a plurality of gear ratios with a clutch control system controlling a first clutch and at least a second clutch including a flow restrictor assembly, the flow restrictor assembly comprising:

a manifold fluidly coupled to the clutch control system to conduct fluid from a fluid supply to the first and second clutches, with the manifold having a modulator bore, an unloading spool bore, and a piston bore each in fluid communication with the fluid supply and the clutch control system;

a modulator spool having a modulator tank orifice, reciprocally mounted in the modulator bore;

a piston reciprocally mounted in the piston bore and operatively connected on one end, by a spring connector, to the modulator spool and biased by a piston spring on the other end; and an unloading spool reciprocally mounted in the unloading spool bore, with the unloading spool selectively in fluid communication with the modulator spool through the modulator tank orifice and biased on one end by an unloading spool spring, with the unloading spool responsive to fluid pressure changes acting on the modulator spool ,as the clutch control system operates, to control the length of time the modulator spool regulates the rate of flow of fluid to the clutch control system through the modulator tank orifice.

12. The flow restrictor assembly of claim 11, wherein the modulator tank orifice is sized between 0.030 inches and 0.250 inches.

13. The flow restrictor assembly of claim 12, wherein the modulator tank orifice is sized between 0.075 inches and 0.080 inches.

14. The flow restrictor assembly of claim 11, wherein the modulator tank orifice is sized between 0.80 millimeters and 6.00 millimeters.

15. The flow restrictor assembly of claim 14, wherein the modulator tank orifice is sized at a nominal 2.00 millimeters.

16. In a vehicle having a transmission engageable in a plurality of gear ratios by engaging and disengaging first and second fluid clutches with the fluid from a fluid supply, a clutch control system comprising:

a first fluid control means for controlling the flow of the fluid to the first clutch;

a second fluid control means for controlling the flow of the fluid to the second clutch, wherein the first and second fluid control means are not both engaged to permit the flow of fluid into their respective clutches during engagement of any gear ratio of the plurality of gear ratios;

a means for conducting the flow of fluid from the fluid supply to the first and second fluid control means;

a means for restricting the flow of the fluid from the fluid supply to the means for conducting the flow of fluid; and a means for generating a signal representative of the pressure of the fluid within the means for conducting the flow of fluid.

17. The clutch control system of claim 16, wherein the means for conducting the flow of fluid and the means for restricting the flow of fluid are disposed within an integral valve body and the means for generating a signal is attached to the valve body.

18. The clutch control system of claim 17, wherein the means for restricting the flow of fluid is a flow restrictor assembly having a modulator valve and an unloading valve, with the unloading valve selectively in fluid communication with the modulator valve through a modulator tank orifice and responsive to fluid pressure changes acting on the modulator valve as the clutch control system operates to control the length of time the modulator valve regulates the rate of flow of fluid to the clutch control system through the modulator tank orifice.

19. The clutch control system of claim 18, wherein the unloading valve is nested inside the modulator valve.

20. The clutch control system of claim 18, wherein the flow restrictor assembly restricts the flow of fluid into the first clutch when the first fluid control means is opened and restricts the flow of fluid into the second clutch when the second fluid control means is opened.

* * * * *